Dec. 1, 1925.
C. S. JOHNSON
MEASURING HOPPER
Filed July 14, 1924
1,563,710
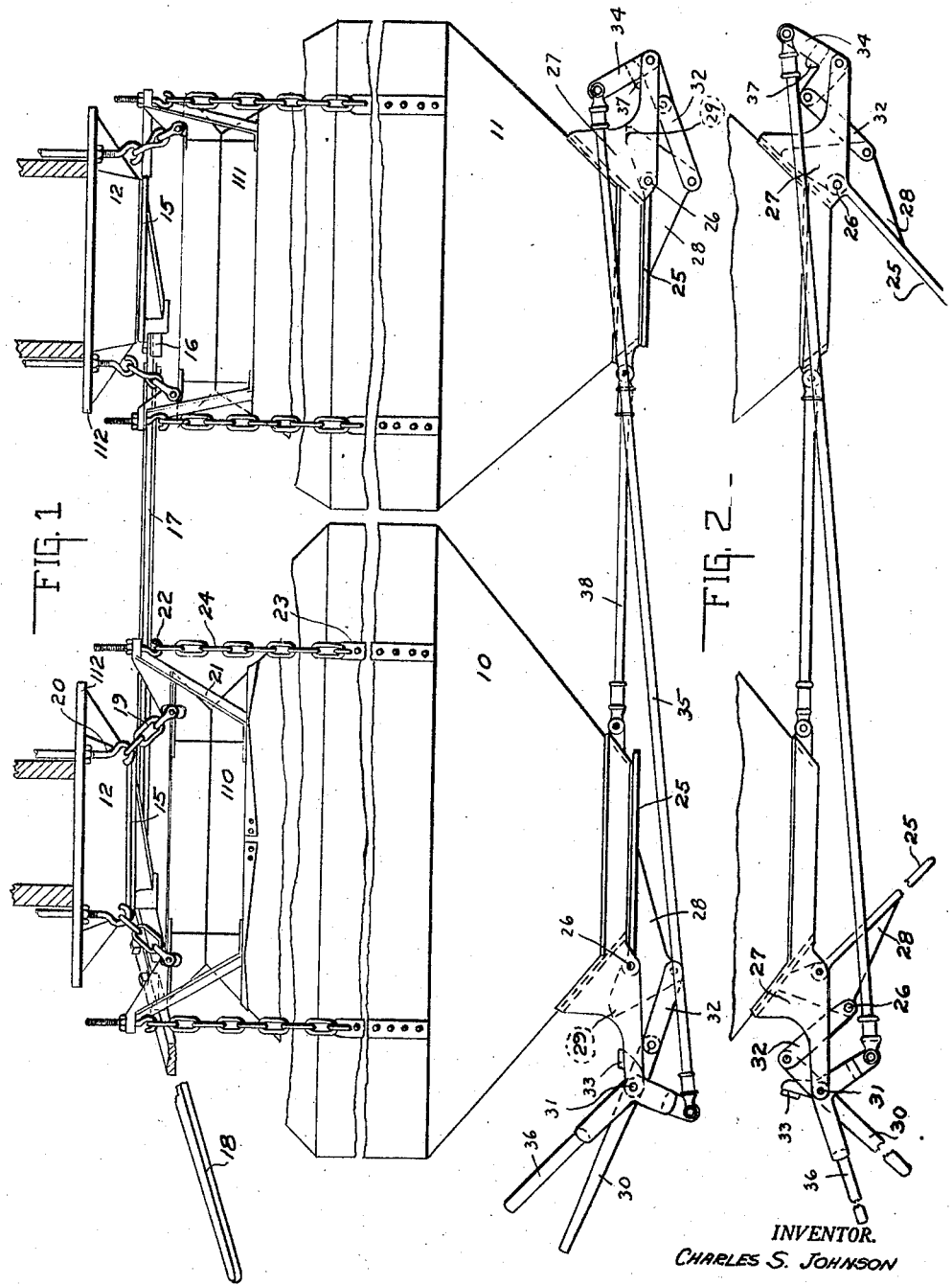
INVENTOR.
CHARLES S. JOHNSON
BY
ATTORNEYS.

Patented Dec. 1, 1925.

1,563,710

UNITED STATES PATENT OFFICE.

CHARLES S. JOHNSON, OF CHAMPAIGN, ILLINOIS.

MEASURING HOPPER.

Application filed July 14, 1924. Serial No. 726,004.

*To all whom it may concern:*

Be it known that I, CHARLES S. JOHNSON, a citizen of the United States, and a resident of Champaign, county of Champaign, and State of Illinois, have invented certain new and useful Measuring Hoppers; and I do hereby declare that the following is a full, clear, and exact description thereof, reference being had to the accompanying drawings, in which like numerals refer to like parts.

This invention relates to improvements in the valve mechanism for controlling the operation of measuring hoppers, used in measuring dry material of any kind and particularly in measuring and loading crushed stone and the like for making concrete.

Most constructions of this kind have a plurality of bin sections for materials of different kinds, such as sand and stone for concrete, and a corresponding plurality of measuring hoppers, and each hopper has a valve for controlling the outlet therefrom that must be operated by hand.

An object of this invention is to provide means for operating two hopper valves, whereby they may be simultaneously opened and closed by the operator. Thus in handling material for concrete, the sand and stone are fed through into the hoppers and loaded into the trucks below simultaneously, but in different quantities, proportioned according to the mixture formula desired for the concrete that is to be made. It is important, therefore, that both hoppers be filled and discharged together.

A further feature of the invention resides in the manner of supporting the measuring hoppers whereby they may be readily adjusted for capacity with varying degrees of accuracy. By means of this arrangement a substantial variation of capacity may be quickly obtained and on the other hand a minute variation or adjustment may be made in the capacity for securing more accurate measurement. This structure has a further advantage both as a means for varying the capacity of the hoppers and the supports therefor.

The full nature of the invention will be understood from the accompanying drawings and the following description and claims:

In the drawings, Fig. 1 is a side elevation of a pair of measuring hoppers, partially broken away, and their associated valve mechanisms for controlling the inlet and outlet of the hoppers. Fig. 2 is the same as the lower part of Fig. 1, with the valves open instead of closed.

The particular construction herein shown and described has been made, adapted and used in connection with structures for measuring and loading loose material, such as gravel, sand, stone and the like for concrete. But the invention is not limited to the sort of loose material handled nor to the purpose for which the material is intended. It may be employed in any situation where loose material like sand, gravel or grain is to be measured, and particularly where a plurality of measuring hoppers of different dimensions should be operated together.

There is shown in the drawings a large, double, conical measuring hopper 10 and a smaller measuring hopper 11. In Fig. 1 they are shown centrally broken away in several places, so that the height of each hopper is relatively greater than shown. These hoppers consist really of two parts, the large major portions 10 and 11, and the upper portions 110 and 111, the lower ends of which project partially into the lower or main portions and are surrounded by the same. This latter feature of construction is not shown because it is common and well known in the art and is not a novel part of this invention. The upper or inlet end of each hopper flares upwardly so as to be hopper-like for receiving the material to be measured from the outlet pan 12 located above it and which is the outlet for a large storage bin above the pan 12, not here shown. This storage bin may be of several tons or a hundred tons capacity. The pan 12 has a wide rectangular rim 112 with inclined downwardly and inwardly tapering sides to the outlet.

The valves for controlling the discharge from the supply bin into the hopper are more fully described in my Letters Patent No. 1,491,803, issued April 29, 1924. However, as shown herein, there are provided the horizontal valves 15 adapted to open and close the openings in the pan 12. Each of the said valves is provided with arms 16 which are connected by a connecting bar structure 17. A hand lever 18 is connected with one of the valves for opening and closing it, and when one is opened or closed the other is given the same movement through the connecting structure 17 and its associated arm. Therefore, it will be observed that simultaneous and unitary control is had of the discharge of the material from the bins to the respective hoppers.

As the upper portions of the hoppers, 110 and 111, are directly connected or formed as a part of the lower or major portions 10 and 11, the lower or major portions are suspended therefrom so as to permit their relative positions to be varied. It will be obvious that upon the two portions being brought closer together, the upper portion telescoping in the lower, the capacity will be reduced. Vice versa, as said portions are separated by lowering the lower portions the capacity will be increased. In order that the measuring capacity of the hoppers may be varied, the lower portions 10 and 11 are adjustably suspended from the upper portions 110 and 111 respectively. In this connection the upper portions 110 and 111 of the hoppers are suspended by the chains 19 from the hooks 20 which are secured to the pans 12. The portions 110, 111 are provided with outwardly extending supporting brackets 21 in which the hooks 22 are mounted, the hook portions thereof extending downwardly and being provided with a relatively long threaded bolt protruding through an ear in the bracket and being supported thereon by a nut for obtaining slight adjustments in the relative positions of the hook and bracket. The lower portions of the hopper are provided with straps 23 rigidly secured to the sides thereof, said straps being connected to the hooks 22 by the chain 24, said chain being of that type having relatively large links. As the straps 23 are provided with suitable hooks, the relative positions of the two portions of the hoppers may be varied by hooking up with various links of the chain. Thereafter a more accurate adjustment may be had by turning the nut on the threaded shank of the hook 22.

By means of this arrangement a very practical and simple means of varying the measuring capacity of the hoppers is obtained, which means also acts as a support for the lower portions thereof.

The valves 25 at the lower ends of the hoppers are pivoted at 26 in a frame 27 secured to the hopper, so that they can swing downward in their opening movement, as seen in Fig. 2. Each valve has a fin or plate 28 on the back of it and centrally located with a stop 29 forming a part thereof adapted to engage the wall of the measuring hopper and limit the opening movement of the valve, as seen in Fig. 2. One valve is controlled by a hand lever 30 pivoted between its ends and its inner end is connected with the plate 28 by a connecting bar 32. This is a toggle arrangement and is arranged so that when the valve is closed, the middle pivot will pass slightly beyond center, but will be prevented from further movement by a bent stop arm 33 which is rigidly connected with the lever 30 and adapted to engage the outwardly extending arm from the frame 27, as seen in Fig. 1.

The other valve 25 for the right-hand measuring hopper is similarly constructed, but is controlled by a bell crank lever 34 which is operated through a long connecting rod 35 by a hand lever 36 fulcrumed at 31, beside the lever 30. This enables one person to operate both valves from one position simultaneously. The bell crank lever 34 has a stop 37 thereon adapted to engage the outward arm from the frame 27 in order to hold the toggle joint in place and hold the valve closed, accomplishing the same purpose as the stop 33. In order for this combined mechanism to operate well, the lower ends of the hoppers must be held in fixed position. Therefore, their lower ends are connected by a rod 38. With this arrangement the slightest movement of the lever 30 or lever 36 will move the toggle joint past center on its return movement and then the way the material is resting on the valves will cause them to open.

The invention claimed is:

1. A pair of measuring hoppers side by side, a brace secured to the lower ends of said two hoppers, a valve for the outlet end of each hopper, a frame on each hopper to which the valve is hinged so that it will open downward, a lever pivoted on one of said frames for operating one of said valves, a second lever pivoted on the other frame for operating the other valve, a connecting rod extending from said second lever to a point near said hand lever, and a second hand lever pivoted on the same frame as the first hand lever for operating said rod, whereby the means for operating said valves are positioned together.

2. A pair of measuring hoppers side by side, a brace secured to the lower ends of said two hoppers, a valve for the outlet end of each hopper, a frame on each hopper to which the valve is hinged so that it will open downward, a fin-like extension on each valve adapted to engage the hopper and limit it to the opening movement of the valve, a lever pivoted on one of said frames for operating one of said valves, a bell crank lever pivoted on the other frame for operating the other valve, a connecting rod extending from said bell crank lever to a position near said hand lever, and a second hand lever pivoted on the same frame as the first hand lever for operating said rod, whereby the means for operating said valves are positioned together.

In witness whereof, I have hereunto affixed my signature.

CHARLES S. JOHNSON.